Aug. 30, 1966          G. HALDEMANN          3,270,111
METHOD OF PRODUCING A HOLLOW ARTICLE
Filed Sept. 29, 1961          2 Sheets-Sheet 1
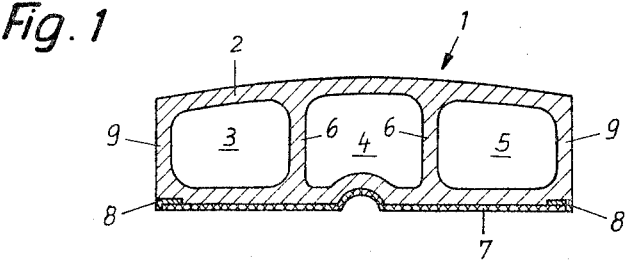
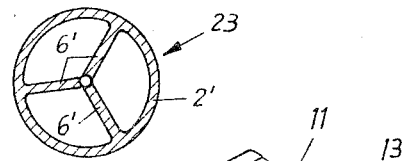
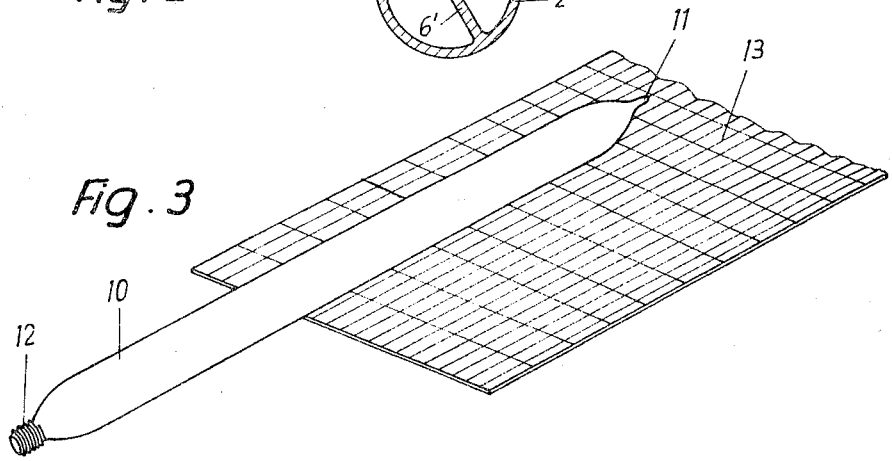
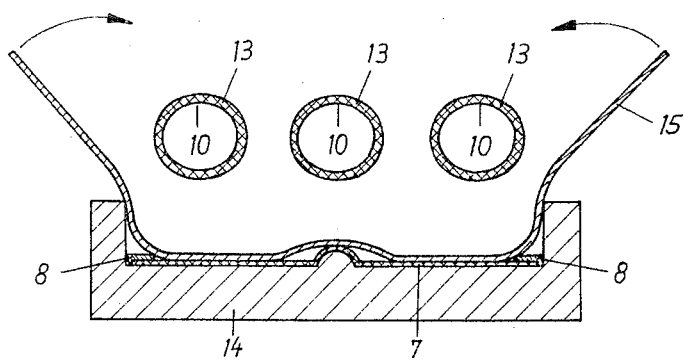

Aug. 30, 1966  G. HALDEMANN  3,270,111
METHOD OF PRODUCING A HOLLOW ARTICLE
Filed Sept. 29, 1961  2 Sheets-Sheet 2

United States Patent Office 3,270,111
Patented August 30, 1966

3,270,111
METHOD OF PRODUCING A HOLLOW ARTICLE
Gaston Haldemann, Geneva, Switzerland, assignor to Haldemann S.A., Geneva, Switzerland
Filed Sept. 29, 1961, Ser. No. 141,892
Claims priority, application Switzerland, May 3, 1961, 5,199/61
2 Claims. (Cl. 264—231)

This invention relates to the production of hollow or recessed articles and has for its primary object to provide a new or improved method of producing multi-recessed articles such as skis by the novel use of glass fibre fabrics, this word being taken in its broadest meaning as including woven, knitted, plaited or otherwie interlaced or intertwined glass fibres irrespective of the cross sectional size of such fibres.

Another object of the invention is to provide a method as aforesaid including inflating air chambers and winding about them a strip or web made of a fibre glass fabric impregnated with a thermosetting material, then wrapping the resultant slugs with a tape made of fibre glass fabric also impregnated with a thermosetting material, compressing the wrapped and deflated slugs as they are introduced into a mold so as to cause one end of them to project outside the mold, inflating the slugs from their projecting end to apply them into contact with the inner face of the mold so as to prestretch the longitudinal fibres of the slugs, and heating the mold to harden the thermosetting material.

A further object of the invention is to provide a multi-recessed article such as a ski by the aforesaid method, the ribs or partitions which divide the interior of the article into a plurality of recesses or alveoli containing no longitudinal armature other than the glass fibres extending lengthwise.

A still further object of the invention is to provide a device for carrying out the aforesaid method, said device being specially utilizable for the production of hollow skis and including a lower portion whose cross sectional area is in the shape of a lying U and an upper portion constituted by a flexible blade and by a movable part having edges facing the edges of said lower portion of the mold, said movable part being downwardly compressible for holding the flexible blade edges between said facing edges.

With these and such other objects in view as will incidentally appear hereafter, the invention comprises the novel steps and combination of steps which characterize the novel method, also the novel parts and combination of parts which characterize the novel device as described with reference to the accompanying diagrammatic drawings exemplifying the same and forming a part of the present disclosure.

In the drawings:

FIGURE 1 is a cross sectional view of a multirecessed ski capable of being produced according to the invention.

FIGURE 2 is a sectional view of a ski stick also made according to the invention.

FIGURE 3 is a perspective view of an air chamber and a glass fibre fabric adapted to be wound about said air chamber.

FIGURE 4 is a diagrammatic view showing the introduction of these air chambers into the lower portion of a shaping mold.

Figure 5:
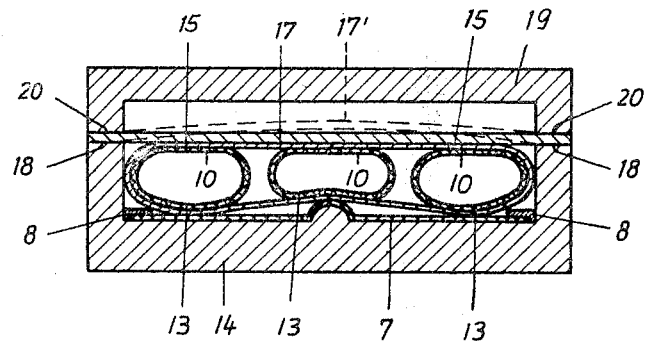
FIGURE 5 is a diagrammatic cross sectional view of a molding device.

As indicated in the foregoing, the method according to the invention is especially applicable to the production of multi-recessed skis. Such a ski is shown in cross section in FIG. 1 and includes an envelope or shell 2 made of glass fibres impregnated with a plastic resinous material such for example as an epoxy resin. The inside of the shell 2 is divided into three longitudinal recesses or alveoli 3, 4, 5 by a pair of ribs or partitions 6. The ski has a gliding sole portion 7 advantageously made of polyethylene and imbedded and concealed steel edge portions 8. By comparison with similar known skis, the improved ski as shown has no wooden longitudinal armature contrary to current opinion of ski makers heretofore to the effect that such an armature is necessary for reinforcing the ribs 6 and side walls 9. The elimination of wooden longitudinal armatures which had a fairly large cross sectional area and the considerable reduction of the ski weight which follows this elimination can only be obtained by making use of the present method which permits a stronger ski to be produced.

For the production of a ski such as the one shown at 1, use is made of three cylindrical air chambers 10 which are distortable elastically and/or plastically. An air chamber 10 is shown in FIG. 3 from which will be seen that it is closed at its end 11 while at its other end it is provided with a union 12 for securing a compressed air feed pipe (not shown). The air chamber 10 is slightly deflected for facilitating winding about it of a strip 13 of glass fibre fabric impregnated with an epoxy resin, care being taken that the longitudinal fibres of said fabric are parallel with the axis of said air chamber 10.

After having prepared three slugs 10-12 constituted by the air chamber 10 and several layers of the glass fibre fabric 13, there is arranged in the lower portion 14 of a mold having a cross sectional area in the shape of a lying U the sole portion 7 and the edge portions 8, also a tape 15 made up of several layers of glass fibre fabric impregnated with an epoxy resin. Care should also be taken here that the longitudinal fibres of the fabric tape 15 extend parallel to the axes of the slugs 10-13. The three slugs 10-13 are then at least partly deflated and inserted into the lower portion 14 of the mold, whereafter the side parts of the tape 15 are folded over said slugs in the direction indicated by the arrows 16. A blank having the shape shown in the lower portion of FIG. 5 is thus obtained.

The upper portion of the mold is constituted by a flexible steel blade 17 whose edges are held against the upper edges 18 of the lower portion 14 of the mold 14-17 by a movable part 19 the two edges 20 of which face the edges 18 of the lower portion 14 of the mold. The movable part 19 is pressed downwardly by any suitable means (not shown). As is obvious, the mold 14-17 has a slightly arcuate shape lengthwise and terminates in a pointed end which is bent as usual.

Figure 6:
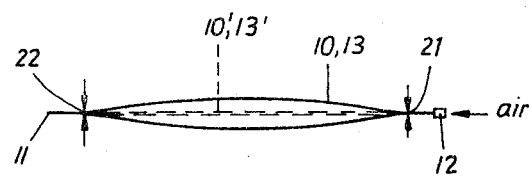
FIGURE 6 is a longitudinal sectional view of highly diagrammatic nature of an air chamber, the purpose of this view being to show how the glass fibres are pre-stretched.

As indicated at 21 in FIG. 6, i.e. where the slug 10-13 penetrates into the mold and at 22 adjacent the closed end 11 and the bent end of the ski, each slug 10-13 is strongly compressed (as shown by the arrows) so that at said positions the free sectional area of the air chamber 10 comprises only a very narrow slit equal to a fraction of a millimeter. The slugs 10-13 are then strongly inflated by introducing into them compressed air through the unions 12. This causes the inflated slugs 10-13 clad by their surrounding tape 15 tightly to engage the inner wall of the mold 14-17 as shown by FIG. 1. The mold 14-17 is then heated to harden the epoxy resin and produce the ski designated in its entirety by 1.

The two following important facts should be stressed:

Firstly, owing to the inflation of the slugs 10-13 which at the beginning of the inflating process are in the condition depicted by 10'-13' as shown by the broken lines in FIG. 6, the longitudinal fibres of the glass fibre fabric 13 have a tendency to assume the curved shape shown in full lines 10–13 in said figure. Consequently the longitudinally extending fibres have a tendency inwardly to glide where indicated by 21 and 22. This, however, is possible only when said fibres are heavily stretched owing to the wedging effect of said slugs at 21 and 22. It follows that the longitudinal glass fibres which, in the 10′–13′ condition, were not stretched and might have slightly different lengths are stretched or tightened and finally all have practically the same length (between 21 and 22) and the same degree of pre-stretched condition which is maintained as the epoxy resin hardens. This is of the utmost importance so far as the strength of the ski is concerned because if the longitudinal fibres had unequal lengths, the shorter fibres would undergo a much larger strain when the ski is being used until they would finally become broken, whereafter the other fibers would also become successively broken and the ski would lose all its rigidity or would be finally broken. This is the reason why hitherto wooden armatures were always used as hereinbefore stated. Since, due to the present improved method, all longitudinal glass fibres are strained simultaneously any risk of breaking is staved off despite the elimination of wooden armatures.

Secondly, owing to the inflation of the slugs 10–13, the flexible blade 17 becomes transversely distorted as shown in broken lines at 17′ in FIG. 5. The upper face of the ski 1 thus acquires a transversely convex shape which accounts to a large extent for its flexibility. In order to modify said transverse convexity of the ski for obtaining skis having different flexibilities, it was necessary in the past to provide a range of ski upper portions having varying concavities. In contradistinction to this, owing to the present method, it is only sufficient to alter the inflating pressure of the slugs 10–13 for varying the transverse convexity of the ski. This is also a major advantage of the improved method and molding device according to the invention.

In the showing of FIG. 2 is illustrated in transverse sectional view a ski stick or cane 23 having three longitudinal recesses or alveoli, also made of glass fibres impregnated with a plastic material hardened by heat application. For producing such a ski stick, the same process as for making the ski 1 is used, namely strips 13 of glass fibre fabric impregnated with a thermosetting plastic are wound about three slightly inflated air chambers 10, the three slugs 10–13 are then wrapped with a tape 15 of similarly impregnated glass fibre fabric, and the slugs 10–13 are deflated and inserted into a suitable mold. The latter may be constituted by a slightly tapering steel tube. The slugs are tightly clamped where indicated by 21, i.e. where they penetrate into said tube while remaining free at their tip end 11. When inflating the air chambers 10 through the union 12 situated outside the mold, a degree of pre-stretch or pre-tension practically equal for all longitudinal fibres is obtained. After heating and hardening the plastic, the slightly tapering ski stick is demolded. This stick has three radial ribs 6′ which reinforce the shell 2′ and is consequently stronger than ribless hollow sticks as used hertofore.

The improved method may be applied likewise to the production of other articles such as airplane or helicopter propeller blades. However, multi-recessed blades obtainable by this method are lighter but at least as strong, nay stronger than solid blades as commonly used. Hollow multi-recessed ship hulls can also be produced by this method and present the advantage of not being submerged if a wall happens to become broken as may occur with double walled hulls of known type.

As indicated in the preamble of this specification, the expression "glass fibre fabric" has a broad meaning and even includes plaited mats essentially made up of longitudinal fibres interconnected exclusively by transverse fibres to such an extent as will enable them to be wound about the air chambers 10, the longitudinal fibres being parallel to their axis.

Minor constructional details may be varied without departing from the scope of the subjoined claims.

What is claimed is:

1. A method of producing a hollow article consisting of the steps of providing inflatable air chambers, inflating said chambers, winding about each of said chambers a strip of glass fiber impregnated with thermosetting material to obtain a slug while arranging for the longitudinal fibers of said fabric to extend parallel to the axis of the air chambers, wrapping said slugs with a tape of glass fiber fabric also impregnated with a thermosetting material while arranging for the longitudinal fibers of said fabric to run parallel to the axis of the slugs, deflating the inflated chambers of the wrapped slugs and inserting the assembly into a mold and strongly compressing them at the position where they enter the mold, inflating the air chambers of the slugs after the same have been inserted into the mold to provide an inner force for the slugs and urge the same into contact with the mold inner wall and to pre-stretch said longitudinal fibers during molding, the wrapped slugs that have been deflated and inserted in the mold are also compressed at a position adjacent their tip end, and finally heating the mold for hardening the thermosetting material.

2. A method of molding shaped plastic articles, consisting of the steps of applying a glass fiber fabric impregnated with a thermosetting material around an inflatable forming core while the same is inflated, enclosing said assembly in a tape, deflating said forming core, inserting said assembly in a molding chamber having rigid and flexible wall portions, and finally inflating said forming core after the assembly has been enclosed in said molding chamber to exert an inner force on said forming core during molding and to cause slight flexing of said flexible wall to shape the material during molding.

References Cited by the Examiner

UNITED STATES PATENTS

| | | | |
|---|---|---|---|
| 1,393,541 | 10/1921 | Kemp | 264—258 |
| 2,024,092 | 12/1935 | Cox. | |
| 2,292,917 | 8/1942 | Williams. | |
| 2,485,827 | 11/1949 | Hartzell | 170—159 |
| 2,886,853 | 5/1959 | Herman et al. | |
| 2,964,795 | 12/1960 | Schaich. | |
| 2,995,781 | 8/1961 | Sipler. | |
| 3,033,730 | 5/1962 | Martin | 156—161 |
| 3,135,640 | 6/1964 | Kepka et al. | 156—147 |

ROBERT F. WHITE, *Primary Examiner.*

JOSEPH REBOLD, *Examiner.*

R. I. SMITH, A. R. NOE, *Assistant Examiners.*